Sept. 19, 1933.  C. KAPNER  1,927,686

COOKING VESSEL FOR ELECTRIC RANGES

Filed Aug. 20, 1931

INVENTOR
Charles Kapner
BY
N. E. Dunlap
ATTORNEY

Patented Sept. 19, 1933

1,927,686

UNITED STATES PATENT OFFICE 1,927,686

COOKING VESSEL FOR ELECTRIC RANGES

Charles Kapner, Bellaire, Ohio

Application August 20, 1931. Serial No. 558,205

1 Claim. (Cl. 219—43)

This invention relates broadly to cooking vessels, and more particularly to a pan designed for use on electric ranges.

The primary object of the invention is to provide a vessel of pan form designed for use on electric stoves and ranges and which is so constructed that, while its bottom may rest directly upon, or in close seating contact with, the usual coil of the heating element, receives its support, or a substantial part of its support, from the rim of the housing for said element, thus to relieve said coil of the full weight of the pan and its contents.

A further object is to provide a pan of the character mentioned having a form which more or less effectually shields the heating element from contact with fluid contents which overflow the walls thereof.

A still further object is to provide a pan wherein rapid escape of heat through the walls thereof is prevented, said walls being at least partially insulated for retaining the heat imparted threto.

With these and other objects in view, the invention resides in the features of construction which will hereinafter be fully described, reference being had to the accompanying drawing, in which—

Figure 1:
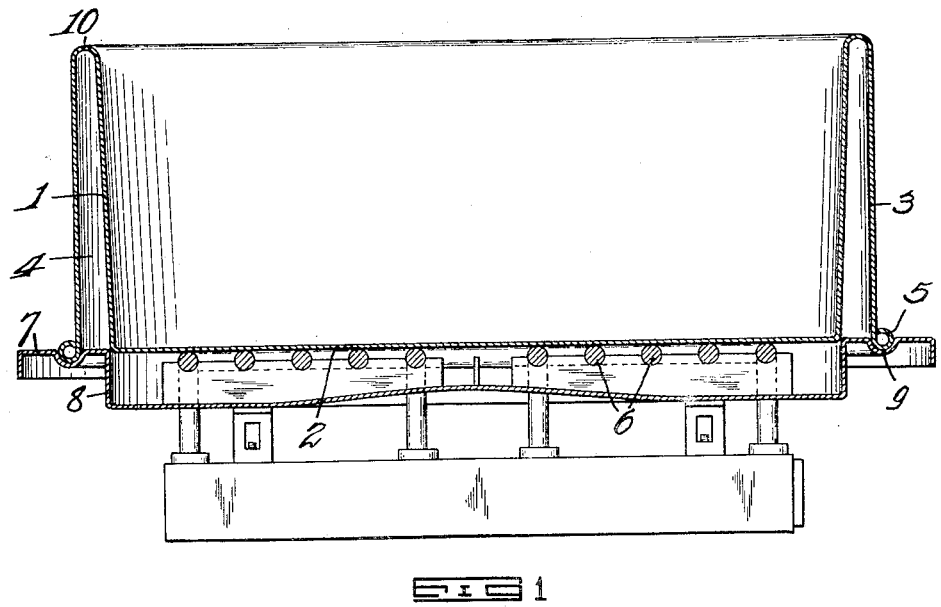
Figure 1 is a vertical section of pan constructed in accordance with my invention mounted upon an electric heating unit of a commercial type; and—

Referring to said drawing, 1 designates the upwardly and outwardly inclined wall, and 2 the substantially flat bottom of a circular drawn sheet metal cooking vessel of pan form. A second wall or skirt 3 annularly encircles said wall 1 and is spaced from the latter to provide an intermediate open space 4. Said skirt is formed integral with and depends from the top of the pan wall 1 to a level below that of the bottom 2 of the pan and, preferably, terminates in an outwardly turned bead or roll 5 designed for seating upon the top of the stove or range in encircling relation to the heating element, or upon the rim or flange 7 of the housing 8 which carries said heating element, as herein shown. To provide for mounting the pan in a position wherein its bottom 2 rests more or less lightly upon the heating element while the slightly longer skirt 3, seated either upon the stove top or upon the housing rim, at least partially supports the weight of the pan and its contents, the level of said heating element 6 may be adjusted relative to that of the surrounding supporting surface, or it may be advisable in some instances to provide in such surfaces a circular seating groove or channel for the reception of the roll 5 of the skirt, as shown at 9 in Fig. 1.

The pan is formed by a sheet metal drawing or spinning process well understood in the art. The skirt, which is united with the circular wall 1 by or through a regularly curved portion 10 of suitable dimension, depends vertically. Thus, the space 4 intermediate the wall and the skirt has a slight upwardly extending taper which facilitates the entering therein of a small brush or the like for cleansing. Said space constitutes an air chamber which, in the seated position of the pan, as shown in Fig. 1, is substantially closed and, consequently, constitutes an insulation which is effective in reducing radiation of heat from the wall of the pan.

Figure 2:
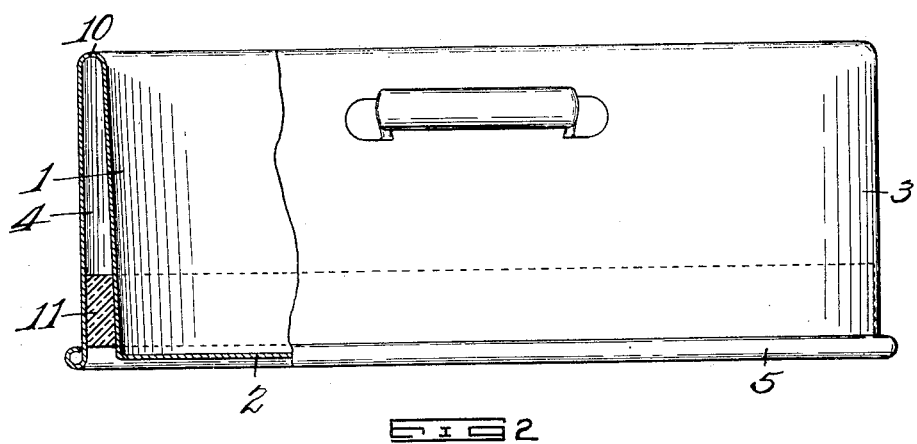
Figure 2 is a view partly in side elevation and partly in section, illustrating a modification.

In the modification shown in Fig. 2, a ring 11 of a suitable heat-insulating material, as asbestos, or a composition including asbestos, is wedged within the lower end of the space 4 in the manner of a plug, thereby to seal the space, forming therein a dead air chamber. Such chamber is especially effective as an insulation against radiation of heat from the pan walls.

By preference, the pan is enamel-coated inside and out, a plurality of such coats being applied to all surfaces, except the under surface of the bottom 2, the latter having applied thereto a single coat of enamel in a dull black color. It has been definitely determined that such treatment of the bottom greatly reduces the time rate at which the contents of the pan are heated in comparison with the heating rate of pans having their bottom surfaces bearing either a plurality of coats of enamel or a single glossy coat of enamel, either black or in color. In other words, tests show that the pan with a thin dull black coating applied to the bottom is superior to, or possesses greatly increased efficiency over, the same pan having either a heavily enamel-coated black bottom, a bottom having a single light coat of gloss enamel, or a bottom having a simple light coat of enamel in color, either glossy or dull.

As is manifest, the firmly seating skirt serves to direct any ebulliating fluid which may overflow from the interior of the pan in a direction away from the heating element, thus shielding the latter from contact with such fluid.

What is claimed is—

In combination with an electric range having a housing provided with an open top and a heating means in the housing, a rim extending outwardly from the top of the housing and formed with a channel which encircles the opening of the top, a cooking vessel composed of a body having a bottom of a size conforming to and in register with the opening of the top in overlying relation to the heating element and having an upwardly extending inner wall and a spaced outer wall connected to the top of the inner wall and depending therefrom, said outer wall having its bottom free and provided with a bead which is receivable in the channel and which forms a support for the body that projects below the bottom thereof a distance so as to hold the bottom only in engagement with the heating means of the range to an extent to relieve the heating means of any supporting weight of the vessel.

CHARLES KAPNER.